United States Patent
Kobayashi et al.

(10) Patent No.: US 8,191,659 B2
(45) Date of Patent: Jun. 5, 2012

(54) WALKING-TYPE WORKING MACHINE

(75) Inventors: Hideaki Kobayashi, Wako (JP); Tomoki Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/991,306

(22) PCT Filed: Apr. 3, 2009

(86) PCT No.: PCT/JP2009/056955
§ 371 (c)(1),
(2), (4) Date: Nov. 5, 2010

(87) PCT Pub. No.: WO2009/136527
PCT Pub. Date: Nov. 12, 2009

(65) Prior Publication Data
US 2011/0048818 A1    Mar. 3, 2011

(30) Foreign Application Priority Data
May 7, 2008    (JP) ................ P2008-121192

(51) Int. Cl.
*B60K 15/063* (2006.01)
*B62D 51/04* (2006.01)
(52) U.S. Cl. .................... 180/19.1; 280/834
(58) Field of Classification Search ............... 180/19.1, 180/19.2, 19.3, 69.4, 69.5; 280/830, 833, 280/834, 770; 137/376, 377
See application file for complete search history.

(56) References Cited

U.S. PATENT DOCUMENTS

| | | | | |
|---|---|---|---|---|
| 3,359,661 A * | 12/1967 | Speiser | ............ | 37/262 |
| 3,452,460 A * | 7/1969 | Cope et al. | ............ | 37/233 |
| 4,255,880 A * | 3/1981 | McMickle et al. | ............ | 37/259 |
| 5,603,173 A * | 2/1997 | Brazell | ............ | 37/244 |
| 5,735,064 A * | 4/1998 | Holl | ............ | 37/260 |
| 5,771,582 A * | 6/1998 | Tuggle | ............ | 30/125 |
| 6,499,236 B2 * | 12/2002 | Yoshida et al. | ............ | 37/219 |
| 2009/0314555 A1 * | 12/2009 | Meyers | ............ | 180/19.1 |

FOREIGN PATENT DOCUMENTS

| | | |
|---|---|---|
| JP | 10-131809 A | 5/1998 |
| JP | 11-243701 A | 9/1999 |
| JP | 2002-272202 A | 9/2002 |
| JP | 2003-225001 A | 8/2003 |

* cited by examiner

*Primary Examiner* — Anne Marie M Boehler
(74) *Attorney, Agent, or Firm* — Arent Fox LLP (57) ABSTRACT

A walking-type working machine in which a gas-container housing section (cassette-type gas container) and a carry handle are mounted to a handle post. The walking-type working machine (10) is provided with a cassette-type gas container (21) mounted to a handle post (16), which rises upward and rearward from a rear section (11*a*) of a working machine body (11), so as to be oriented in the longitudinal direction of the handle post. A gas engine (12) is driven by fuel in the cassette-type gas container (21). The walking-type working machine is provided with a carry handle (22) for carrying the machine. The carry handle (22) is mounted to the handle post and is formed so as to surround the cassette-type gas container. The carry handle has a grip (45).

4 Claims, 7 Drawing Sheets

WALKING-TYPE WORKING MACHINE

TECHNICAL FIELD

The present invention relates to a walk-behind working machine having a cartridge-type gas cylinder disposed to extend along a handle post and a gas engine driven by fuel held in the cassette cylinder.

BACKGROUND ART

A walk-behind working machine is known from, for example, Patent Document 1. The known walk-behind working machine includes a handle post extending rearwardly upwardly from a rear part of a working machine body and a carrying handle extending upwardly from an upper part of an outer peripheral wall of the handle post. The carrying handle is provided with a grip part to be gripped by a hand for allowing lift and carriage of the walk-behind working machine.

A gas-engine-powered working machine is also known from, for example, Patent Document 2. The known working machine includes a working machine body carrying a gas engine thereon, a handle post extending rearwardly upwardly from a rear part of the working machine body, a cylinder housing section provided at an upper part of an outer peripheral wall of the handle post, and a cassette- or cartridge-type gas cylinder housed in the cylinder housing section.

The carrying handle of Patent Document 1 is arranged to extend upwardly from the upper part of the outer peripheral wall of the handle post. In the gas-engine-powered working machine of Patent Document 2, the gas cylinder housing section is provided at the upper part of the outer peripheral wall of the handle post. In other words, the carrying handle and the cylinder housing section are both provided at the upper part of the outer peripheral wall.

Thus, the cylinder housing section presents a bar to mounting of the carrying handle to the handle post of the gas-engine-powered working machine. Consequently, there exists a demand for a working machine which allows mounting of both the cylinder housing section and the carrying handle to the handle post of the gas-engine-powered working machine.

PRIOR ART LITERATURE

Patent Document

Patent Document 1; Japanese Patent Application Laid-Open Publication No. 2002-272202
Patent Document 2: Japanese Patent Application Laid-Open Publication No. HEI-10-131809

SUMMARY OF INVENTION

Object Sought to be Solved by Invention

It is an object of the present invention to provide a walk-behind working machine which allows provision of a cylinder (gas cartridge) housing section and a carrying handle on a handle post.

Means to Solve the Object

According to an aspect of the present invention, there is provided a walk-behind working machine, which comprises: a working machine body; a handle post extending rearwardly upwardly from a rear part of the working machine body; a cartridge-type gas cylinder disposed to lie along a length of the handle post; a gas engine capable of being driven by fuel contained in the cartridge-type gas cylinder; and a carrying handle disposed on the handle post and having a grip formed to surround the cartridge-type gas cylinder.

With this arrangement, it becomes possible to carry the walk-behind working machine by gripping and lifting the grip. Further, by arranging the carrying handle to surround the cartridge-type gas cylinder, it becomes possible to dispose both the cylinder housing section and the carrying handle on the handle post. Moreover, with the carrying handle disposed to surround the cartridge-type gas cylinder, the cartridge-type gas cylinder can be protected by the carrying handle.

Preferably, the walk-behind working machine further comprises a cylinder cover disposed between the cartridge-type gas cylinder and the carrying handle for holding the cartridge-type gas cylinder and being capable of opening and closing actions. In this arrangement, when the cylinder cover is opened, the cylinder cover is brought into contact with the carrying handle to thereby providing an appropriate degree of opening of the cylinder cover. By thus providing the appropriate level of opening of the cylinder cover, the cartridge-type gas cylinder can be changed easily to thereby easy handling of the machine.

Desirably, the grip comprises left and right grip parts extending in a forward direction of the working machine from positions on left and right sides of the cartridge-type gas cylinder in a gradually converging fashion.

If the walk-behind working machine is designed to allow carriage by two persons, the load required for carriage of the machine can be reduced. It is thus advisable to arrange the carrying handle to allow carriage by two attendants standing on left and right sides of the machine. In the present invention, the grip thus has the left and right grip parts. The left and right grip parts are provided such that they extend from left and right sides of the gas cylinder in the forward direction of the machine in such a manner as to gradually diverge. This provides a relatively large distance between the left and right grip parts so that the two attendants standing on left and right sides of the machine can hold the respective left and right grip parts without encountering interference one by other.

It also becomes possible to arrange the left grip part to be inclined leftwardly outwardly and to arrange the right grip part to be inclined righwardly outwardly. When the attendant standing on the left side of the walk-behind working machine grips the left grip part with his right hand, the back of his right hand can be inclined forwardly in correspondence with the left grip part, whereby the right hand can be placed in a posture suitable for lifting the left grip part.

Similarly, as the attendant standing on the right side of the walk-behind working machine grips the right grip part with his left hand, the back of his left hand can be inclined forwardly in correspondence with the right grip part, whereby the left hand is placed in a posture suitable for lifting the right grip part. As a result, the two attendants standing on the left and right sides of the walk-behind working machine can easily grip the respective left and right grip parts, whereby the working machine is imparted with increased mobility.

In a preferred form, the grip has a central grip part extending between front end parts of the left and right grip parts. By arranging the left and right grip parts to extend in the forward direction of the working machine in a diverging fashion, it is possible to provide a large space or distance between the front end parts of the left and right grip parts. This enables the central grip part to have a large length, whereby gripping (and hence lifting) of the central grip part becomes easy, allowing a single attendant to carry walk-behind working machine. Mobility of the working machine is thus increased.

MODE FOR CARRYING OUT THE INVENTION

In the mode to be discussed below, a walk-behind tiller will be described as an example of the walk-behind working machine. However, the present invention should not be construed as being limited to the walk-behind tiller.

Figure 1:
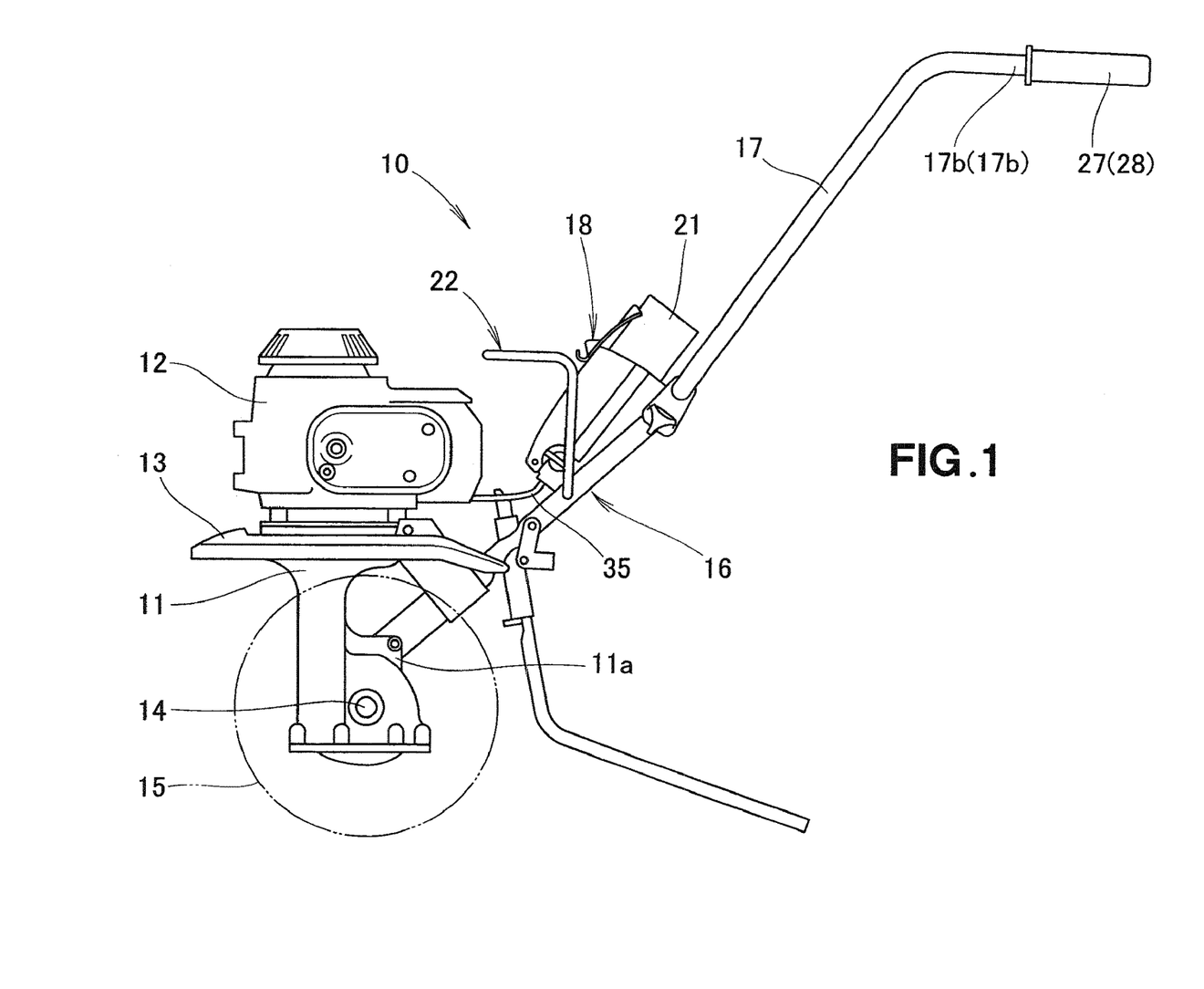
FIG. 1 is a side elevational view illustrating a walk-behind working machine according to the present invention.

The walk-behind working machine 10 as shown in FIG. 1 is comprised of a gas engine 12 placed on an upper end part of a tiller body (working machine body) 11, a fender 13 disposed below the gas engine 12, a plurality of tilling tines disposed below the fender 13 via a tilling shaft 14, a handle post 16 provided at a rear part 11a of the tiller body 11, an operating handle 17 disposed on the handle post 16, a cylinder housing or retaining section 18, a cartridge-type gas cylinder 21 housed in the cylinder housing section 18, and a carrying handle 22 provided on the handle post 16.

In the walk-behind working machine 10, the gas engine 12 is driven by fuel in the gas cylinder or cartridge 21. The power produced by the engine 12 is transmitted to the tilling shaft 14 so that the tilling shaft 14 is rotated to till a soil with the tilling tines 15 while the machine runs with the operating handle 17 gripped by an operator.

The gas engine 12 is of the type which is driven by fuel gas supplied from the gas cylinder or cartridge 12.

Figure 2:
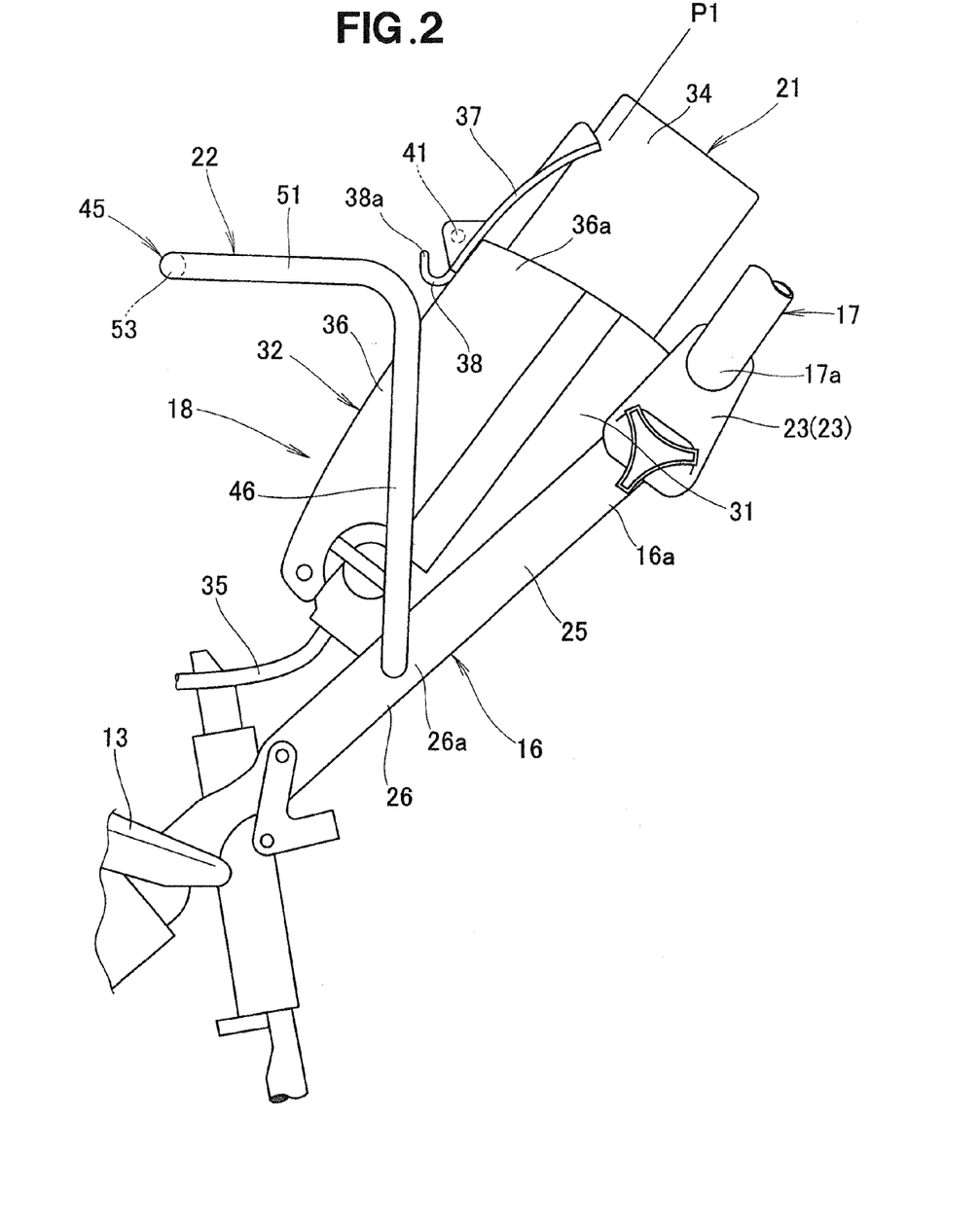
FIG. 2 is a side elevational view showing a cylinder housing section and a carrying handle of FIG. 1.
Figure 3:
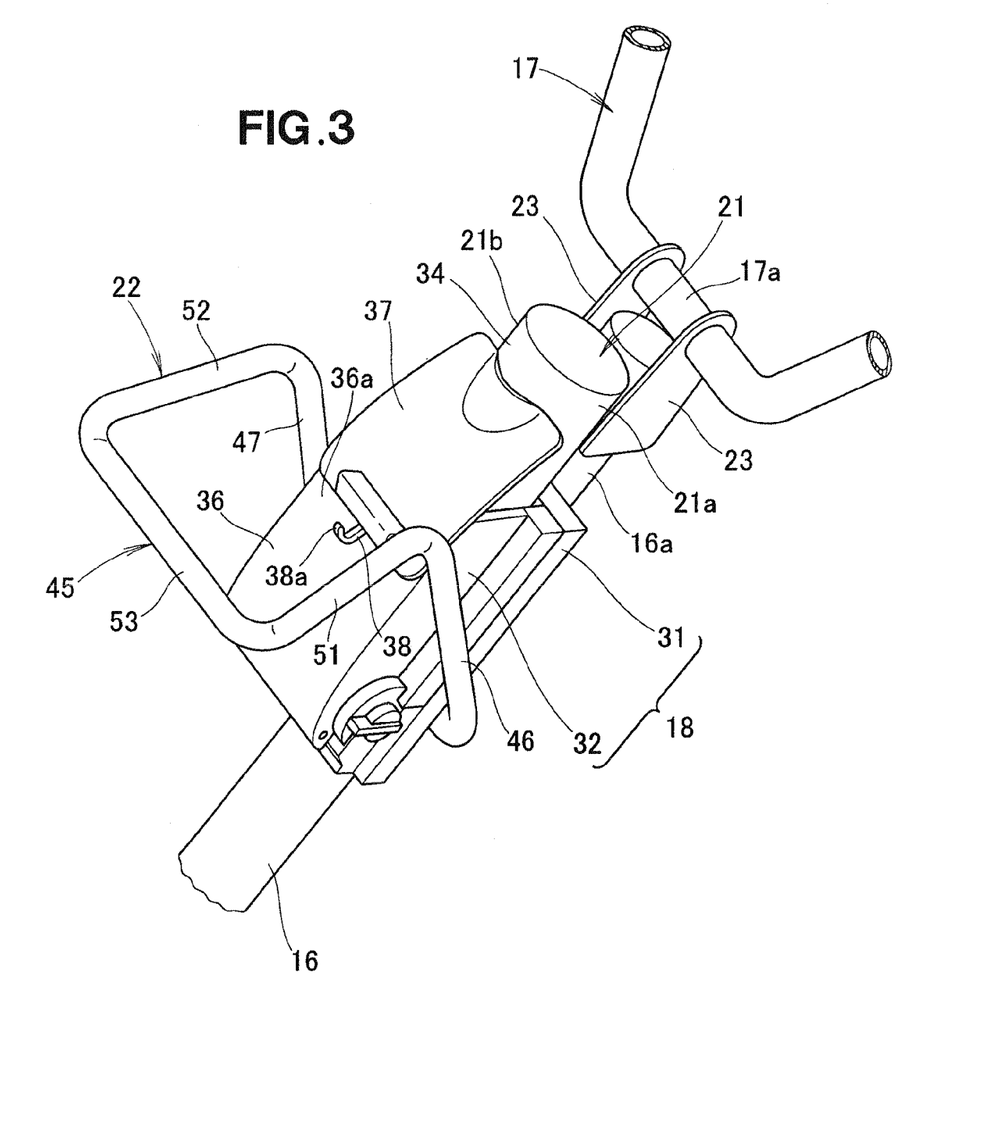
FIG. 3 is a perspective view showing the cylinder housing section and the carrying handle of FIG. 2.

As shown in FIGS. 2 and 3, the handle post 16 comprises a tubular member extending rearwardly upwardly from a rear part of the working machine body. The operating handle 17 is supported on an upper end part 16a of the handle post 16 via right and left support brackets 23. The cylinder housing section 18 is provided on an upper half 25 of the handle post 16 in such a manner as to extend along the cylinder housing section 18. The carrying handle 22 for carriage is provided on a generally central peripheral wall section 26.

The operating handle 17 comprises a tubular member formed into a U-shape as seen from a front side therefor, as shown in FIG. 3. The operating handle 17 has a lower end part 17a mounted to the upper end part 16a of the handle post 16 via the right and left support brackets 23 and is provided at right and left upper or rear end parts 17b with right and left grips 27, 28 (see FIG. 1), respectively.

The cylinder housing section 18 comprises a base 31 provided to extend along the upper half 25 of the handle post 16 and a cylinder cover 32 provided pivotally relative to the base 31.

The base 31 has a mouthpiece support part, not shown, for removably supporting a mouthpiece of the gas cylinder 21. By mounting the mouthpiece of the gas cylinder 21 to the mouthpiece support part, the gas cylinder 21 is placed to lie along the upper half 25 of the handle post 16.

The gas cylinder 21 comprises a commercially available gas cartridge filled with liquefied butane consisting chiefly of butane (hereinafter called "liquefied fuel gas"). The gas cylinder 21 has a cylinder or container body 34 with a jet nozzle protruding from the mouthpiece of the container body 34, as shown in FIG. 3. By pressing the jet nozzle into the container body 34, the liquefied fuel gas held inside the container body 34 is lead out into a supply passage 35.

The cylinder cover 32 is positioned between the gas cartridge or cylinder 21 and the carrying handle 22 and capable of pivotal movement between a closed position P1 (FIG. 2) wherein the gas cylinder 21 is pressed against the base 31 and an opened position P2 (see FIG. 6) wherein the gas cylinder mounting and removal are allowed. The cylinder cover 32 is held in the closed position P1 in such an orientation as to lie along the upper half 25.

The cylinder cover 32 comprises a main cover 36 pivotally provided to the base 31, a sub-cover 37 pivotally mounted to a distal end 36a of the main cover 36, and a locking pawl 38 provided on the sub-cover 37.

The main cover 36 is configured such that it can be held in the closed position P1 by means of a spring member not shown. By retaining the main cover 36 in the closed position P1, the main cover 36 brought into contact with the gas cylinder 21. As a result, the gas cylinder 21 is press-held by the main cover 36.

The sub-cover 37 is supported pivotally on a distal end part 36a of the main cover 36 via a support pin 41 and is configured to allow positioning in the closed position P1 via a spring member, not shown. Retaining the sub-cover 37 in the closed position P1 causes the sub-cover 37 to come into contact with the gas cylinder 21. As a result, the gas cylinder is held firmly by the sub-cover 37.

As the main cover 36 is moved to the opened position P2 (FIG. 6) against the resiliency of the main cover spring member, not shown, and the sub-cover 37 is moved to the closed position P2 against the resiliency of the sub-cover spring member, not shown, the locking pawl 38 is brought into locking engagement with the carrying handle 22. As a result, the main cover 36 and the sub-cover 37 are held in the opened position P2. As the main cover 36 and the sub-cover 37 are thus opened, it becomes possible to hold the covers 36, 37 in contact with the carrying handle 22 to thereby provide a suitable degree of opening of the covers 36, 37.

By thus providing a suitable degree of opening of the main cover 36 and the sub-cover 37, easy mounting and removal of the gas cylinder 21 is enabled. A mode of locking engagement of the locking pawl 38 with the carrying handle 22 will be discussed later with reference to FIG. 6.

Figure 4:
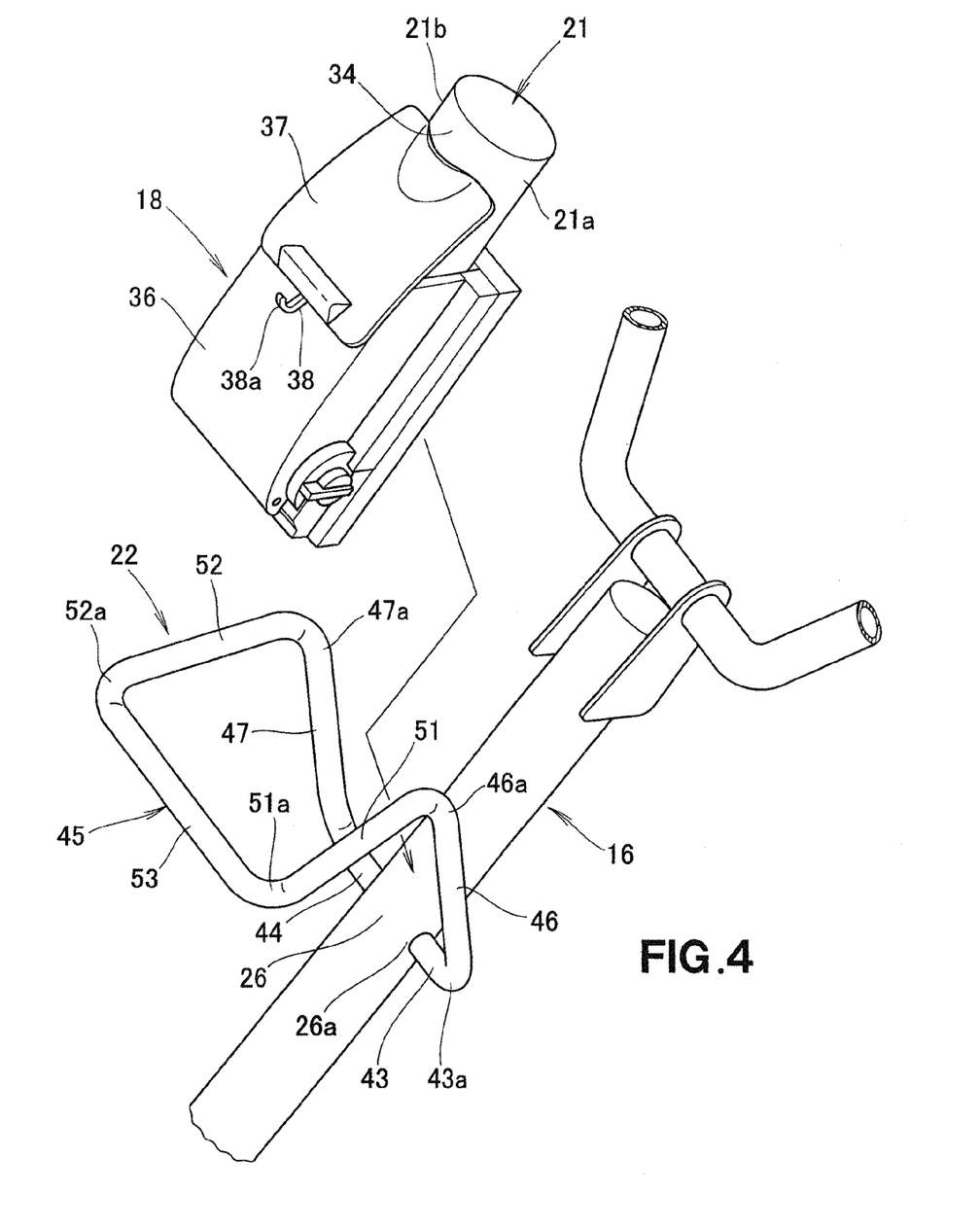
FIG. 4 is an exploded perspective view showing the handle post of FIG. 3 with the cylinder housing section removed therefrom.
Figure 5:
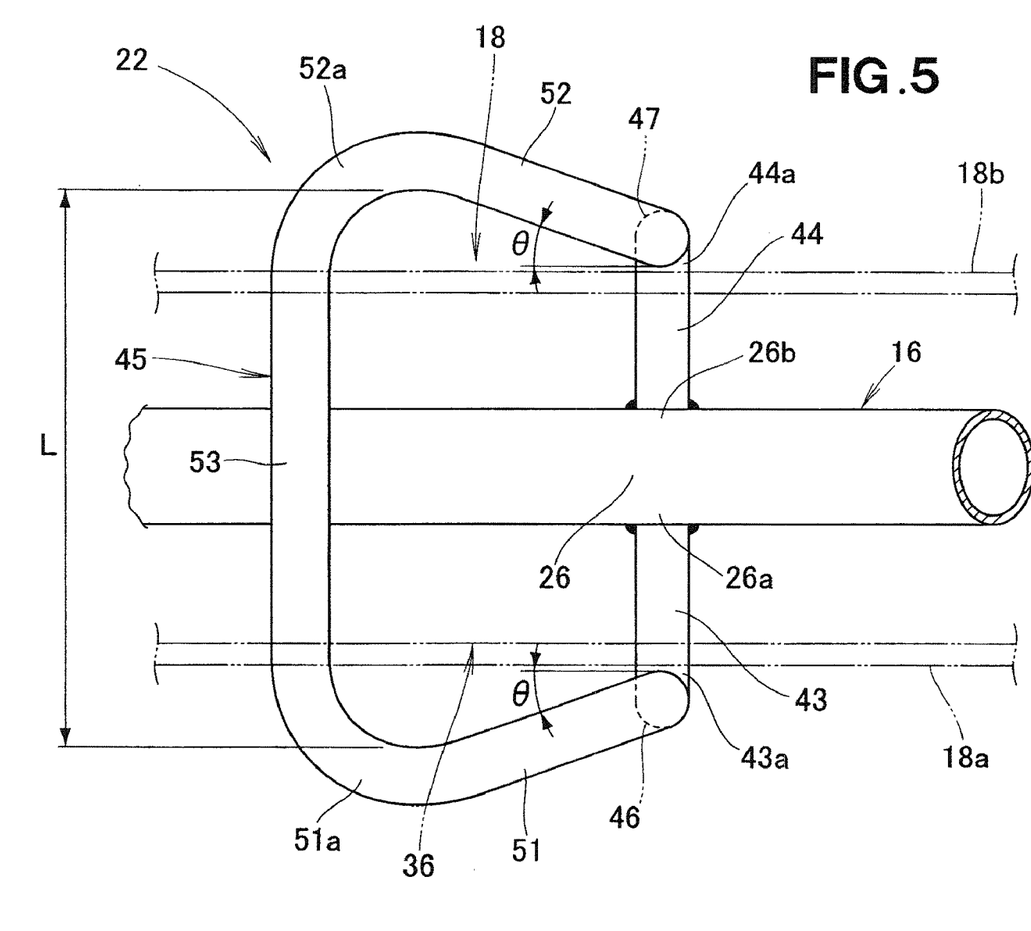
FIG. 5 is a top plan view illustrating the carrying handle of FIG. 4.

As shown in FIGS. 4 and 5, the carrying handle 22 is formed by integrally bending a tubular member. The carrying handle 22 includes left and right horizontal bases 43, 44 which are weld-connected to left and right side wall parts 26a, 26b of the generally central peripheral wall 26 of the handle post 16. The carrying handle 22 also includes a grip 45 positioned upwardly of the cylinder cover 32.

Specifically, the carrying handle 22 is comprised of the left and right horizontal bases 43, 44 provided respectively at the left and right side wall parts 26*a*, 26*b*, a left leg part 46 provided on the left horizontal base 43, a right leg part 47 provided on the right horizontal base 44, and the grip 45 provided on the left and right leg parts 46, 47.

The left horizontal base 43 extends horizontally outwardly from the left side wall part 26*a*. The left horizontal base 43 is positioned below the cylinder housing section 18, with its outer end part 43*a* located outwardly of a left side part 18*a* of the cylinder housing section 18. The right horizontal base 44 is positioned coaxially with the left horizontal base 43 and extends horizontally outwardly from the right side wall part 26*b*. The right horizontal base 44 is positioned below the cylinder housing section 18, with its outer end part 44*a* located externally of a right side part 18*b* of the cylinder housing section 18. The left and right horizontal base 43, 44 are formed symmetrically.

The left leg part 46 extends upwardly from an outer end part 43*a* of the left horizontal base 43 and is positioned on the left side part 18*a* of the cylinder housing section 18. The right leg part 47 extends upwardly from an outer end part 44*a* of the right horizontal base 44 and is positioned outwardly of the right side part 18*b* of the cylinder housing section 18. The left and right leg parts 46, 47 are formed symmetrically.

The grip 45 is provided on the respective upper end parts 46*a*, 47*a* of the left and right leg parts 46, 47 and takes the form of a generally U shape. The grip 45 comprises left and right grip parts 51, 52 provided on the left and right leg parts 46, 47, and a central grip 53 provided between the left and right grip parts 51, 52.

The left grip part 51 extends forwardly of the working machine from the upper end part 46*a* of the left leg part 46 horizontally in such a manner as to be inclined gradually outwardly at an inclination angle of θ. The right grip part 52 extends forwardly of the working machine from the upper end part 47*a* of the right leg part 47 horizontally in such a manner as to be inclined outwardly at an inclination angle of θ. In other words, the left and right grip parts 51, 52 extend horizontally from the upper end parts 46*a*, 47*a* of the left and right leg parts 46, 47 in a forward direction of the working machine in a gradually diverging manner and are symmetrically formed.

That is, the left and right grip parts 51, 52 are positioned upwardly of the cylinder housing section 18 and are formed to diverge toward a forward direction of the working machine. Consequently, it is possible to provide a relatively large distance L between the left grip part 51 and the right grip part 52. This permits two operators or attendants standing on left and right sides of the walk-behind working machine 10 to grip the respective left and right grip parts 51, 52 without being interfered by a hand of a companion operator.

In addition, with the left grip part 52 arranged to extend in a forward direction of the working machine in such a manner as to be inclined an angle θ outwardly, it becomes possible for the operator standing on the left side of the walk-behind working machine 10 to easily grip and lift the left grip part 51 with his right hand. On the other hand, with the right grip part 52 arranged to extend in a forward direction of the walk-behind working machine 10 in such a manner as to be inclined an angle θ outwardly, it is possible for the operator standing on the right side of the walk-behind working machine 10 to easily grip and lift the right grip part 52 with his left hand.

The central grip part 53 is provided between a front end part 51*a* of the left grip part 51 and a front end part 52*a* of the right grip part 52 and extends horizontally transversely of the machine. The central grip part 53 is positioned below the cylinder housing section 18. Similarly to the distance L, by arranging the left and right grip parts 51, 52 to extend in a forwarding diverging manner, it is possible to make relatively large.

With the central grip part 52 thus arranged to have a relatively large length, the central grip part 53 can be easily gripped (lifted).

As explained above, the carrying handle 22 includes the left and right horizontal bases 43, 44 provided at the left and right side wall parts 26*a*, 26*b* of the generally central peripheral wall part 26, the left and right horizontal bases 43, 44 positioned below the cylinder housing section 18, the left and right leg parts 46, 47 provided on left and right sides of the cylinder housing section 18, and the grip 45 provided above the cylinder housing section 18.

The carrying handle 22 is thus formed to surround the gas cylinder or cartridge 21. By providing the carrying handle 22 to thus surround the gas cylinder 21, it becomes possible to dispose both the cylinder housing section 18 and the carrying handle 22 on the handle post 16.

The carrying handle 22 for transportation use is provided with the grip 45. This makes it possible to grip the grip 45 and lift and transport the walk-behind working machine 10.

Note also that the carrying handle 22 includes the left and right horizontal bases 43, 44, the left and right grip parts 51, 52, and the central drip part 53, which are arranged to surround the cylinder housing section 18 (and hence the gas cartridge 21). As a result, the gas cylinder is protected by the carrying handle 22.

Figure 6:
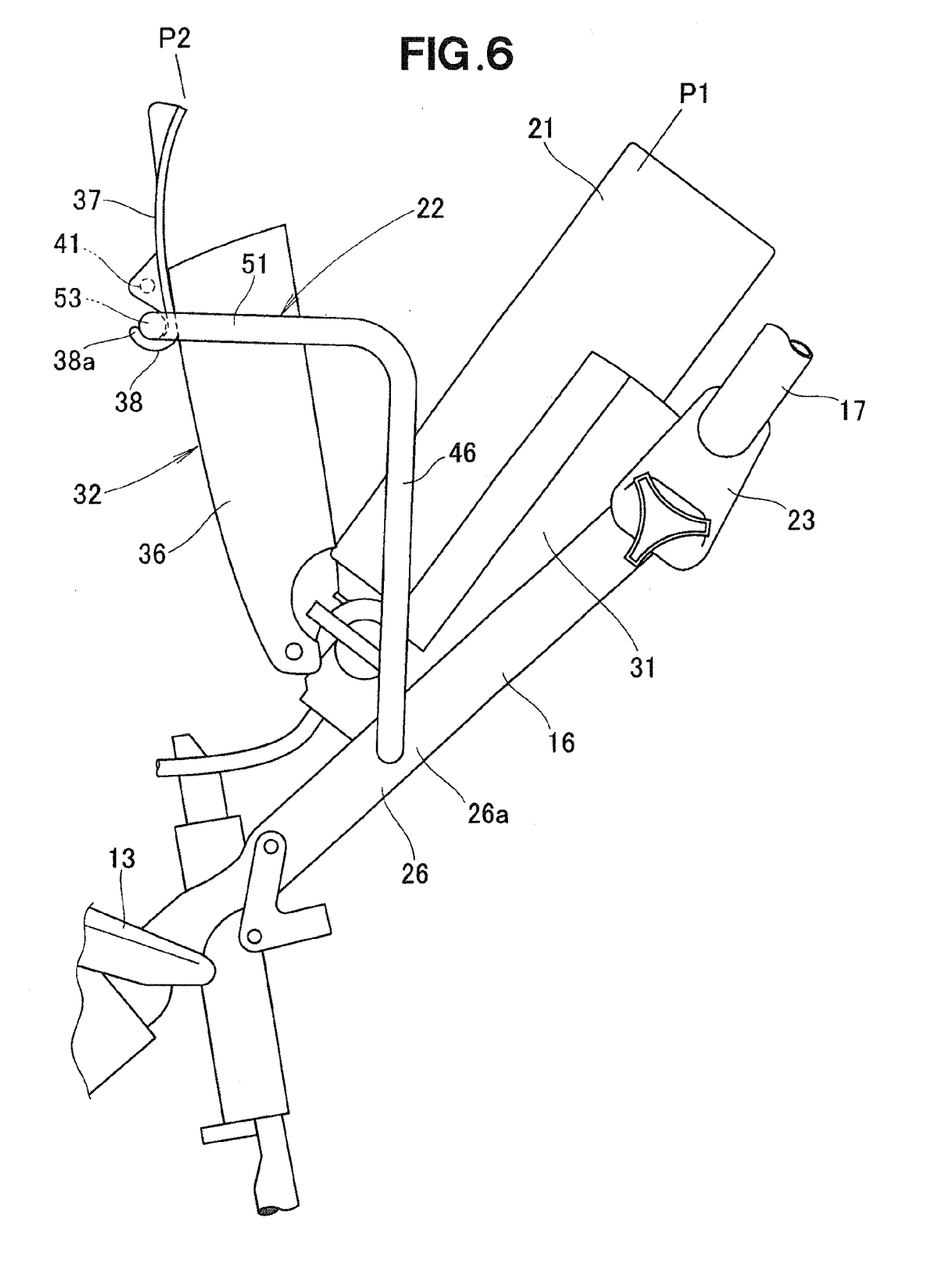
FIG. 6 is a view showing an example in which a cylinder cover of FIG. 2 is placed in an open position.

Next, discussion will be made as to an operation for retaining the cylinder cover 32 in the opened position P2, with reference to FIG. 6.

The main cover 36 is moved to the opened position P2 against the resiliency of the main-cover spring member (not shown), followed by moving the sub-cover 37 to the opened position P2 against the resiliency of the sub-cover spring member (not shown). The main cover 36 is brought into contact with the central grip part 53 of the carrying handle 22. This places the main cover 36 and the sub-cover 37 in an appropriate degree of opening.

Further, when the main cover 36 is brought into contact with the central grip part 53 of the carrying handle 22, the distal end 38*a* of the locking pawl 38 is elastically deformed to lockingly engage with the central grip part 53. The main cover 36 and the sub-cover 37 are thus maintained in the opened position P2. The main cover 36 and the sub-cover 37 are thus kept in the appropriately opened position, thereby allowing easy loading and unloading of the gas cartridge 21.

To unlock the distal end 38*a* of the locking pawl 38 from the central grip part 53, the sub-cover 37 is moved in a counter-clockwise direction about the support pin 41. Then, the distal or top end 38*a* of the locking pawl 38 moves downward to cause the top end 38*a* to be released from the central grip part 53, whereby the main cover 36 becomes capable of moving toward the closed position P1 by the resilient force of the main cover spring, not shown.

Figure 7A:
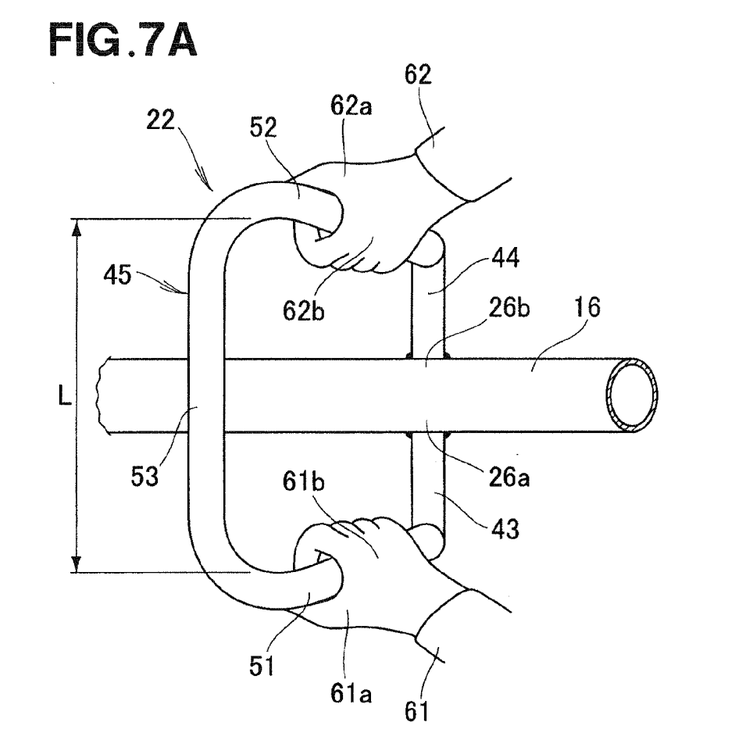
FIG. 7A is a view showing the walk-behind working machine being carried by two persons gripping the carrying handle.
Figure 7B:
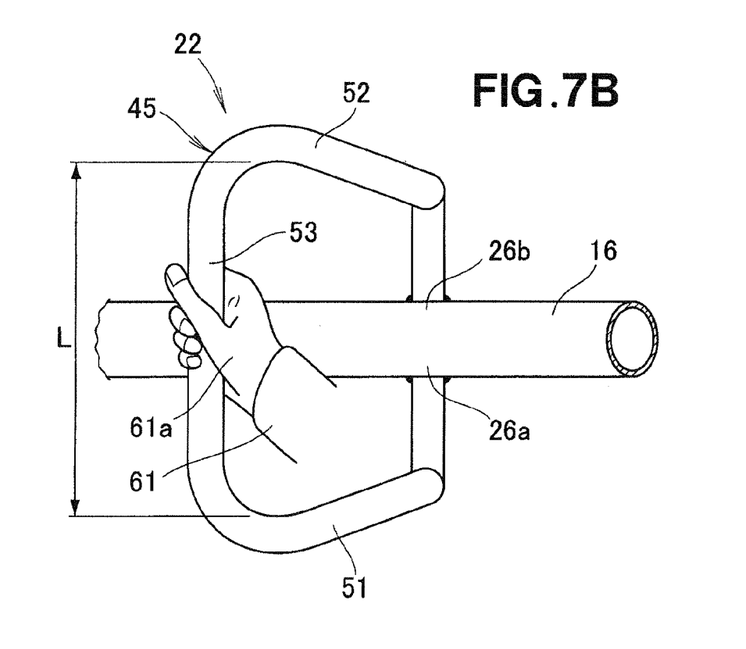
FIG. 7B is a view showing the walk-behind working machine being carried by a single person gripping the carrying handle.

Referring now to FIGS. 7A and 7B, discussion will be made as to shipping of the walk-behind working machine 10 by using the carrying handle 22. FIG. 7A illustrates the walk-behind working machine 10 being carried by the two attendants standing on the left and right sides of the machine, whilst FIG. 7B illustrates the working machine 10 being carried by a single attendant.

As shown in FIG. 7A and discussed above, the space L left between the left grip part 51 and the right grip part 52 is relatively large. This enables a carrying attendant 61 standing on the left side of the walk-behind working machine 10 to grip the left grip part 51 and a carrying attendant 62 standing on the right side of the working machine to grip the right grip part 52 without being interfered one by another.

The left grip part 51 extends in the forward direction of the working machine in such a manner as to be inclined outwardly at the inclination angle of θ (FIG. 5). As the left carrying attendant 61 grips the left grip part 51 with his right hand 61a, the back 61b of his right hand 61a leans forward in correspondence with the left grip part 51. Consequently, the right hand 61a is placed in the posture that makes it easier to lift the left grip part 51 compared to the case wherein the back 61b of the right hand 61a is laterally oriented (that is, when the left grip part 51 is positioned parallel to the handle post 16). The left side carrying attendant 61 can thus easily lift the left grip part 51 with his right hand 61a.

Similarly to the left grip part 51, the right grip part 52 extends toward the forward direction of the working machine in an outwardly inclined manner at the inclined angle of θ (FIG. 5). When the right-hand side carrying attendant 62 grips the right grip part 52 with his left hand 62a, the back 62b of the left hand 62a leans forward in correspondence with the right grip part 52. Thus, the left hand 62 is placed in the posture that makes it easier to lift the right grip part 52, compared to the case wherein the back 62b of the left hand 62a is placed in lateral orientation (that is, when the right grip part 52 lies parallel to the handle post 16). The right-hand side carrying attendant 62 can thus easily lift the right grip part 52 with his left hand 62a.

With the left and right grip parts 51, 52 thus arranged to extend forwardly of the working machine in an outwardly inclined manner at the inclination angle of θ (FIG. 5), the left- and right-hand side carrying attendants can easily grip the respective left and right grip parts 51, 52 so as to carry the walk-behind working machine 10 (FIG. 1) to a desired location.

As shown in FIG. 7B, the left and right grip parts 51, 52 extend outwardly in a diverging fashion toward the forward direction to allow the central grip part 53 to have a relatively large length. This makes it easy for, e.g., left-hand side carrying attendant 61 to grip or lift the central grip part 53 with his right hand 61a. The walk-behind working machine 10 (FIG. 1) can thus be carried by a single carrying attendant and is imparted with increased mobility.

The carrying handle 22, the cylinder cover 32, the grip 45, the left and right grip parts 51, 52 and the central grip part 53 have been described in the present embodiment as examples only and the invention should not be construed as being limited thereto because changes and modifications are possible.

INDUSTRIAL APPLICABILITY

The present invention is particularly useful for application to a walk-behind working machine wherein a gas cartridge is placed along a handle post and an engine is driven by the fuel fed from the gas cartridge.

LEGEND

10 . . . walk-behind working machine; 11 . . . working machine body; 11a . . . rear part of the working machine body; 12 . . . gas engine; 16 . . . handle post; 21 . . . cartridge-type gas cylinder; 21a, 21b . . . left and right side parts of the gas cartridge; 22 . . . carrying handle; 32 . . . cylinder cover; 45 . . . grip; 51 . . . left grip part; 52 . . . right grip part; and 53 . . . central grip part

The invention claimed is:

1. A walk-behind working machine comprising:
a working machine body;
a handle post extending rearwardly upwardly from a rear part of the working machine body;
a cartridge gas cylinder disposed to lie along a length of the handle post;
a gas engine mounted on the machine body capable of being driven by fuel contained in the cartridge gas cylinder; and
a carrying handle disposed on the handle post and having a grip formed to surround the cartridge gas cylinder.

2. The walk-behind working machine of claim 1, further comprising a cylinder cover disposed between the cartridge gas cylinder and the carrying handle for holding the cartridge gas cylinder and being capable of opening and closing actions.

3. The walk-behind working machine of claim 1, wherein the grip comprises left and right grip parts extending in a forward direction of the working machine from positions on left and right sides of the cartridge gas cylinder in a gradually converging fashion.

4. The walk-behind working machine of claim 3, wherein the grip comprises a central grip part extending between front end parts of the left and right grip parts.

* * * * *